Oct. 16, 1928.

J. ROBINSON 1,688,287

AUTOMATIC TRAIN PIPE COUPLING

Original Filed July 1, 1921

INVENTOR
Joseph Robinson,
BY Watson, Coit,
Morse & Grindle,
ATTORNEYS

Patented Oct. 16, 1928.

1,688,287

UNITED STATES PATENT OFFICE.

JOSEPH ROBINSON, OF NEW YORK, N. Y.

AUTOMATIC TRAIN-PIPE COUPLING.

Application filed July 1, 1921, Serial No. 481,966. Renewed January 3, 1927.

This invention relates to automatic train pipe couplings and the object is to improve the means by which such couplings are supported from the car. It is frequently desired to adjust the coupling head forward of the supporting bracket to compensate for coupler wear. With previous constructions this adjustment is possible only when the coupling is in the uncoupled position. With the present invention the adjustment may be readily made from either the coupled or uncoupled position, from which is had the important advantage of being able to increase the pressure on the coupling heads while they remain coupled, and thus avoid the delay and expense of parting the cars. In this manner a tight joint between the coupling head may be uniformly and easily maintained.

The invention resides in the constructions, combinations and arrangements, hereinafter described, pointed out in the appended claims and illustrated in the accompanying drawings in which:

Figure 1:
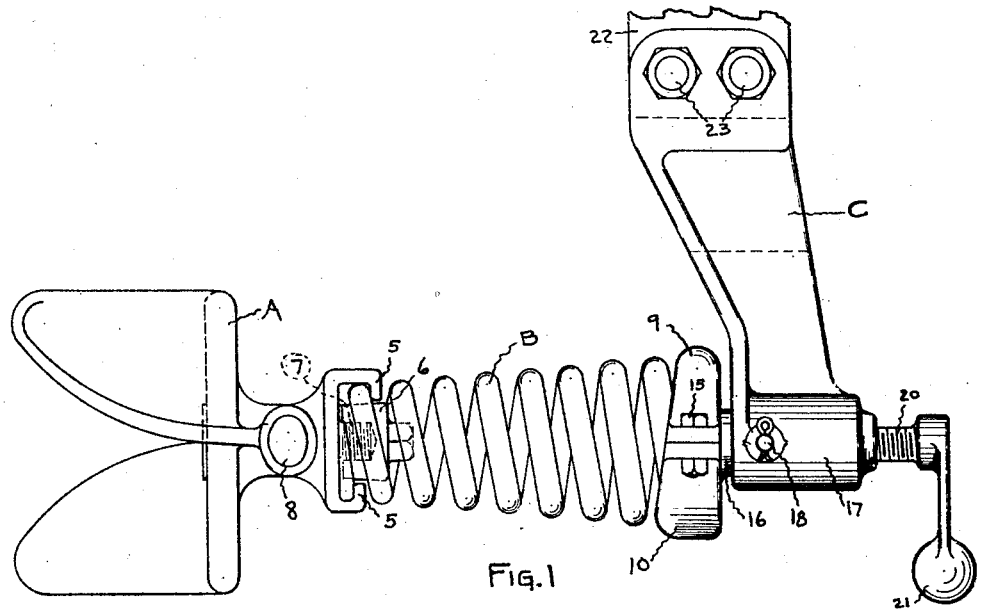
Figure 1 is a side elevation of my improvement.
Figure 2:
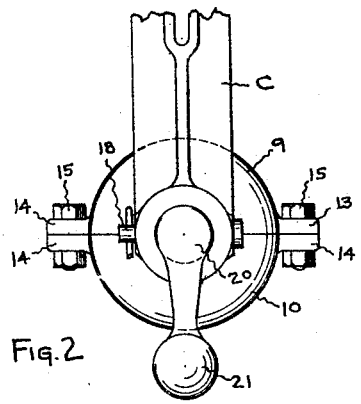
Figure 2 is a rear elevation thereof, with the coupling head omitted.
Figure 3:
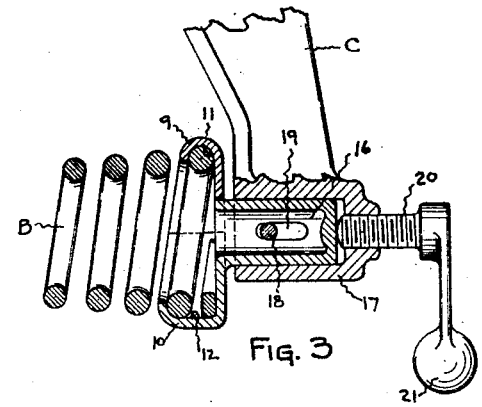
Figure 3 is a vertical sectional view through the lower end of the bracket, showing the rear portion of the supporting spring, and the clamp, in section.
Figure 4:
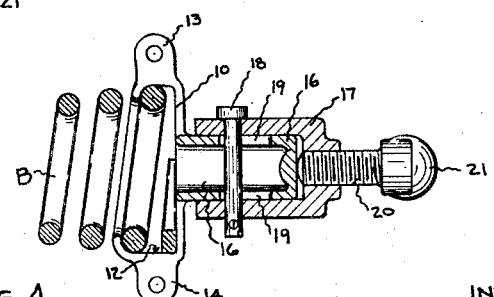
Figure 4 is a sectional plan view on the line 4—4 of Figure 3.

Having reference to the drawings: Any suitable coupling head A may be carried by my improved support, and may be secured thereto in any desired manner as by dogs 5 behind which the apex end of the supporting spring B is locked by the tapered wedge nut 6 which is threaded to the stud 7 of the head and which expands the end coils of the spring into firm engagement with the dogs 5. A suitable conduit 8 diverges laterally of the head and receives in any preferred manner the usual train pipe hose, not shown. In my United States Patent No. 1,245,788, dated November 6th, 1917 this construction of head and anchor for the spring B is fully described.

My improved support comprises the aforesaid spring B, which is preferably conical in outline and coiled of a tapered bar. The base end of the spring is firmly locked in a clamp comprising the jaws or seats 9 and 10 each of which is provided with an interior semi-circumferential groove or recess 11 and 12 which receives and conforms substantially to the shape and pitch of the base coils of the spring B. Laterally extending ears 13 and 14 project from opposite sides of the jaws, and through these pass bolts 15 by which the jaws are rigidly clamped to the rear end of the spring B. A cylindrical stem or projection 16 extends rearwardly from about the center of the jaw 10 into a chamber 17 formed in the lower end of the bracket C. A key 18 extends through the chamber 17 and through an elongated slot 19 formed in the stem 16, to prevent rotation of the stem in the chamber and thus maintain the coupling head A properly positioned. A set screw adjustment device 20, having a weighted handle 21 to maintain it in a predetermined position, is adjustably threaded through the rear wall of the chamber 17, as shown, and engages the rear end of the stem 16 and serves as an abutment to shift the spring and the coupling head A forward or backward relative to the bracket C, the set screw 20 is turned in the desired direction through the medium of the handle 21. If the set screw be turned to the right it will urge the clamp, comprising the jaws 9 and 10, forward and thus shift the coupling head A and the spring B away from the bracket C. Either this or the reverse adjustment may be made while the coupling head is coupled to a counterpart head. In this manner the pressure of the spring B upon the head may be increased or decreased without parting the cars, and the position of the supporting means for the coupling head A may be varied with reference to the bracket. Frequently leaks between the faces of the mated coupling heads can in this manner be effectually overcome. The spring B constitutes the sole means for yieldingly supporting the coupling head A for maintaining it in the proper service position. The spring yieldingly resists all movement of the head away from the normal uncoupled position. The bracket C is, of course, suitably connected to the usual lug 22 of the car coupler as by bolt 23.

What I claim is:

1. In an automatic train pipe connector, a bracket having a chamber extending into the same from the front thereof, a member extending from the front of the bracket rearwardly into said chamber, a coupling head, yielding means connected to said head and to the front end of said member for supporting the head in front of the bracket, and means for moving said member in said chamber.

2. In an automatic train pipe connector, a bracket having a chamber adjacent its lower end, a member slidably mounted in said chamber, and having a socket at the front end, a coupling head, a coiled spring connected to said head and secured in the socket of said member for supporting the head in front of the bracket, and means engaging the rear portion of said member for moving the same in said chamber.

3. In an automatic train pipe connector, a bracket having a chamber provided with a rear wall, a member slidably mounted in said chamber, a device extending through the rear wall of said chamber and adapted to engage said member for moving the same in the chamber, a coupling head, and yielding means rigidly connected to said head and said member.

4. In an automatic train pipe connector, a bracket having an opening at its lower end, a member slidably mounted in said opening, a coupling head, a spring secured to said head and said member for supporting the head in front of the bracket, and a device extending from the rear into said opening for engaging and moving said member.

5. In an automatic train pipe connector, a bracket having an opening, a member slidably and non-rotatably mounted in said opening, a device extending through the rear face of said bracket for engaging and moving said member, a coupling head, and a coiled spring secured to said head and said member.

6. In an automatic train pipe coupling, the combination of a coupling head, a bracket provided at its lower end with a chamber, a member extending into said chamber and adapted to slide therein, means to prevent rotation of the member in the chamber, a spring seated on said member and connected with said coupling head, means to clamp the spring to said member, and screw means to adjust the member in said chamber.

7. In an automatic train pipe coupling, the combination of a coupling head, a bracket having an opening therein a member mounted in said opening, and having a semi-circumferential groove, a spring a portion of the rear end of which is mounted in said groove and the other end of which is connected with said coupling head, a part having a semi-circumferential groove occupied by the other portion of the rear end of said spring, means to rigidly clamp said part to said member to lock said spring in said grooves, means to adjust the member and said part relative to said bracket to vary the distance between said coupling head, and the bracket, and means to maintain said adjusting means in the adjusted position.

8. In an automatic train pipe coupling, the combination of a coupling head, a bracket having an opening in its lower end provided with a rear wall, a spring between the bracket and said coupling head for supporting the latter, a clamp comprising members clamped about the rear end of said spring, a projection extending rearwardly from said clamp into the opening in said bracket and having an elongated slot, a pin ending through said slot into a wall of said bracket to prevent excessive rotation of said clamp relative to said bracket, and a device threaded through the rear wall of said opening into engagement with said projection to shift said clamp relative to said bracket.

9. In an automatic train pipe connector, a coupling head, a bracket, means for supporting said head in front of said bracket, said means including a stem movably supported on said bracket, a spring secured to said stem and projecting forwardly thereof and connected to said head and an adjustable abutment for limiting rearward movement of said stem relative to the bracket.

10. In an automatic train pipe connector, a coupling head, a bracket, means for supporting said head in front of said bracket, said means including a stem slidably and non-rotatably supported on said bracket, and an abutment carried by said bracket for contacting with said stem, said abutment being adjustable in the bracket toward and from said head.

11. In an automatic train pipe connector, in combination, a coupling head, a bracket, means for supporting said head in front of said bracket, said means including a member supported on said bracket, a spring secured at its rear end to said member and at its front end to said head, and an abutment threaded into said bracket and positioned to engage said member, to limit the rearward movement thereof.

In testimony whereof I affix my signature.

JOSEPH ROBINSON.